United States Patent [19]

Hammar

[11] 4,308,322
[45] Dec. 29, 1981

[54] BATTERY CELL AND ELECTROLYTE CIRCULATION PUMP

[75] Inventor: Richard H. Hammar, Fraser, Mich.

[73] Assignee: General Motors Corporation, Detroit, Mich.

[21] Appl. No.: 210,517

[22] Filed: Nov. 28, 1980

[51] Int. Cl.³ ............................................ H01M 2/12
[52] U.S. Cl. ...................................... 429/53; 429/72; 429/81
[58] Field of Search ...................... 429/81, 72, 67, 53

[56] References Cited

U.S. PATENT DOCUMENTS 2,584,117  2/1952  Elrod, Jr. ............................ 136/159
3,083,253  3/1963  Sundberg ............................ 136/160
3,928,080  12/1975  Aronson ................................ 429/81

Primary Examiner—Charles F. LeFevour
Attorney, Agent, or Firm—Douglas D. Fekete

[57] ABSTRACT

A pump is disclosed which utilizes battery gas for circulating a body of liquid electrolyte in an electrochemical cell. The pump comprises an electrolyte conduit immersed in the electrolyte body and having an electrolyte inlet adjacent the bottom of the electrolyte body, an electrolyte outlet closely below the surface of the body, and a gas inlet below the outlet. The pump also comprises a hood for collecting battery gas rising in the electrolyte body and a passage for conveying collected gas from the hood to the conduit gas inlet. Gas bubbles released into the conduit at the gas inlet rise and carry electrolyte to the outlet, thereby circulating the electrolyte.

5 Claims, 3 Drawing Figures

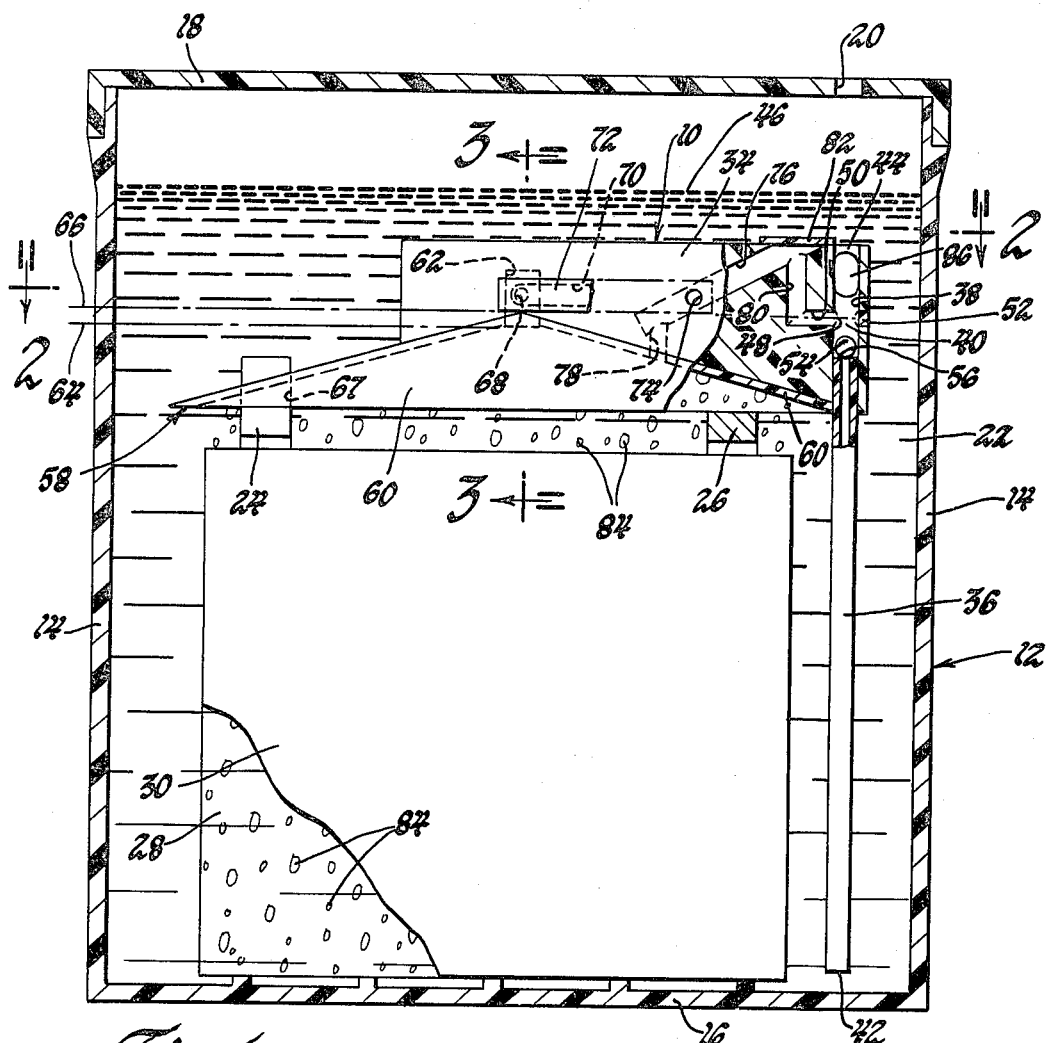
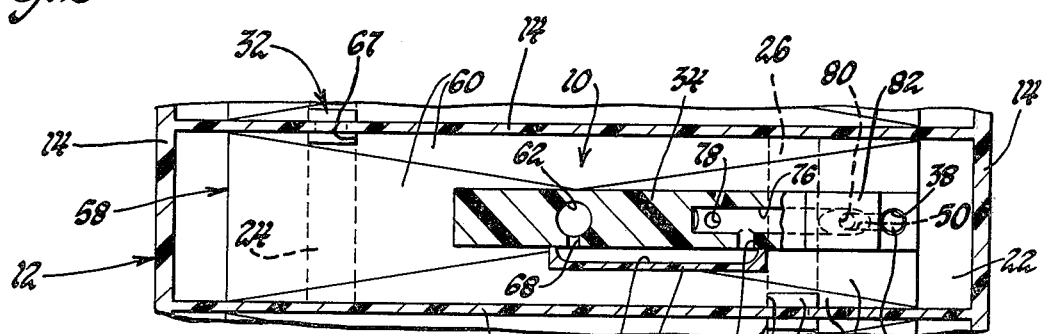
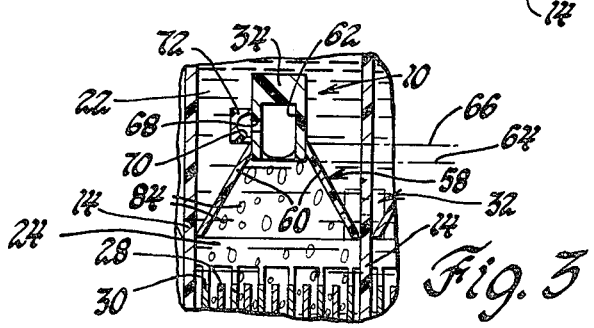

BATTERY CELL AND ELECTROLYTE CIRCULATION PUMP

BACKGROUND OF THE INVENTION

This invention relates to a pump for circulating electrolyte within an electrochemical cell. More particularly, this invention relates to a completely in-cell pump that utilizes battery gas to lift solution of an electrolyte body from near the bottom and mix it with solution near the top, thereby vertically stirring the electrolyte body.

During deep cycling of a lead-acid cell comprising a body of an aqueous sulfuric acid electrolyte, solution near the bottom tends to become more concentrated and denser than solution near the top. This electrolyte stratification reduces cell capacity, at least in part, because of electrolyte starvation near the top. Thus, to maintain cell performance, it is necessary to stir the electrolyte body. A common practice is to apply a relatively large overvoltage to the electrodes during recharging to create many small gas bubbles that rise and agitate the electrolyte. However, freely rising bubbles are relatively ineffective for stirring the denser, bottom electrolyte. Thus, excessive gassing is required, which wastefully consumes electrolyte and enhances spalling of the active electrode material. It has also been proposed to circulate the elctrolyte using an air lift wherein air is intermittently pumped into an open-end vertical tube immersed in the electrolyte. The air lift is more efficient than free bubbles, but complicates battery operations and requires an air pump outside the cell with connections to the tube.

It is an object of this invention to provide a self-stirring battery cell construction having a liquid electrolyte body and employing battery gas to lift solution from a bottom region of the electrolyte body to a top region, thereby vertically stirring the electrolyte body.

It is a further object of this invention to provide an electrolyte circulation pump adapted to be enclosed completely within a battery container and to operate therein, without supplemental external equipment, to reduce electrolyte stratification. The pump collects battery gas from relatively small bubbles that are produced during cell operations and releases relatively large bubbles in an electrolyte conduit, which bubbles rise and carry liquid from the bottom to the top of the electrolyte body more efficiently and more effectively than freely rising small bubbles.

SUMMARY OF THE INVENTION

In a preferred embodiment, an electrolyte circulation pump is adapted to be immersed in a liquid electrolyte body of a battery cell and comprises a hood that is adapted to cover electrodes also immersed in the body. The hood is further adapted for intercepting gas bubbles rising in the electrolyte body and collecting the gas therefrom in an open-bottom chamber. The pump also comprises a vertical conduit having an electrolyte inlet near the bottom of the body and an outlet near the surface. A one-way valve provided in the conduit permits electrolyte flow only from the inlet to the outlet. The conduit also has a gas inlet located below the outlet so that a gas bubble introduced there rises to the outlet. Gas passages connect the hood chamber to the gas inlet for conveying collected gas into the conduit. The size, shape and relative positions of the hood, gas inlet and connecting passages are such that gas collected at the hood is intermittently delivered into the conduit in the form of a discrete, relatively large bubble.

During cell recharging, relatively small gas bubbles float up from the electrodes and are collected by the hood. When sufficient gas has been collected, a relatively large gas bubble is released in the conduit. The rising bubble lifts liquid that is above it out the conduit, which liquid is replaced by liquid drawn up into the conduit through the bottom inlet. The one-way valve prevents the liquid drawn into the conduit from falling back out before the next bubble, particularly where the bottom liquid is heavier because of stratification. Thus, the pump of this invention employs the gas from freely rising bubbles to lift a slug of liquid in a conduit, and thereby improves the effectiveness of the gas to circulate the electrolyte. Liquid is pumped vertically from the bottom to the top of the body and between regions of extreme densities in a stratified body. Furthermore, the pump requires no moving parts, is incorporated completely within the battery and utilizes battery gases that are normally produced during cell operations.

DESCRIPTION OF THE DRAWINGS

The present invention will be further illustrated with reference to the accompanying drawing wherein like numerals designate like elements.

FIG. 1 is a cross-sectional view of an electrochemical cell having an electrolyte circulation pump of this invention;

FIG. 2 is a cross-sectional view of the cell in FIG. 1 taken along line 2—2 looking in the direction of the arrows; and FIG. 3 is a cross-sectional view of a portion of the electrochemical cell in FIG. 1 taken along line 3—3 and looking in the direction of the arrows.

DETAILED DESCRIPTION OF THE INVENTION

Referring to the Figures, a preferred electrolyte circulation pump 10 of this invention is intended to be enclosed completely within a sealed battery container 12 comprising sidewalls 14, an integrally molded bottom wall 16 and an attached cover 18 having a gas vent 20. Pump 10 is entirely immersed in a body 22 of liquid electrolyte and rests upon plate straps 24 and 26 that collect current from positive electrode plates 28 and negative electrode plates 30, respectively, and are connected to adjacent cells by through-the-wall connections, shown generally at 32. Plates 28 and 30 are alternately stacked with ribbed microporous polymer separators (not shown) therebetween.

In this embodiment, pump 10 is formed in major part from a single polymer block 34. A vertical polymer tube 36 is partially inserted in a bore 38 of block 34 and cooperates therewith to form an open-end electrolyte conduit 40. Conduit 40 has an electrolyte inlet 42 near container bottom 16, but spaced slightly therefrom to permit unrestricted liquid flow into the conduit. Conduit 40 also has an outlet 44 for both gas and electrolyte slightly below electrolyte surface 46. Conduit 40 also features a gas inlet 48 above tube 36. Inlet 48 is formed by drilling a bore 50 in block 34 perpendicularly intersecting bore 38 and inserting plug 52. The inner diameter of tube 36 is less than the diameter of bore 38. A plastic ball 54 having a diameter less than the bore diameter, but greater than the tube diameter, fits loosely in bore 38 and rests upon the upper end 56 of tube 36. Ball 54 is adapted to be lifted by electrolyte flowing upward from inlet 42 to outlet 44, but to seal end 56 to prevent downward flow. Thus, ball 54 and tube end 56 cooperate to form a one-way valve.

Pump 10 also comprises a hood 58 that overlies electrode plates 28 and 30. Hood 58 comprises four inclined baffle plates 60 in open-bottom substantially rectangular pyramid arrangement. Baffle plates 60 converge at an open-bottom cylindrical chamber 62 bored in block 34 and opening at a level 64 below the level 66 of the conduit gas inlet 48. Notches 67 are provided in plates 60 to accommodate straps 24 and 26 at connections 32.

Chamber 62 has a side opening 68 above level 66 leading to a horizontal passage 70. Passage 70 is formed by a member 72 affixed to block 34 and features a semicircular cross section. An opening 74 connects passage 70 with an inclined gas passage 76 in block 34. An electrolyte-return drain 78 is bored in block 34 to inclined passage 76 below opening 74. A vertical passage 80 connects inclined passage 76 above opening 74 with bore 50, which provides a passage to inlet 48. Passage 76 and passage 80 are formed by drilling block 34 and covering with a cap 82. Thus, chamber 62 is tortuously connected with conduit gas inlet 48 through opening 68, passage 70, opening 74, passage 76, passage 80 and passage 50.

During cell operation, particularly during recharging, relatively small gas bubbles 84 are formed at electrode plates 28 and 30 and float up through the body 22. Bubbles 84 are intercepted by baffle plates 60 and are diverted to chamber 62. The collected gas flows from chamber 62 into passage 70 and thereafter into passage 76. In passage 76, the gas is freed from any liquid that may be carried along with it. The liquid flows downwardly and returns to body 22 through drain 78. Liquid-free gas flows upwardly and thereafter through passages 80 and 50 to inlet 48 and into conduit 40.

Gas is intermittently delivered into conduit 40, forming a bubble 86 therein. In general, bubble 86 is released when the collected gas in chamber 62 approaches level 64. Bubble 86 rises in conduit 40 and through outlet 44, the gas being ultimately released through vent 20. As bubble 86 rises, it lifts liquid that is above it in conduit 40 out outlet 44 and causes liquid to be drawn in through inlet 42 and past ball 54. The one-way valve comprising ball 54 and opening 56 prevents the liquid from flowing back after the bubble escapes, particularly where liquid entering through inlet 42 is denser than liquid above outlet 44, as is the case for a stratified electrolyte body. Thus, rising bubble 86 pumps liquid from bottom to top of body 22 and thereby causes the electrolyte to circulate within container 12.

In the pump of this invention, pumping is produced by the buoyancy of bubbles 86 intermittently released into the electrolyte conduit. The volume of gas released is preferably sufficient to form a bubble that fills a horizontal cross section of the conduit 40. Smaller bubbles allow liquid to flow downwardly about the bubble and reduces the pump efficiency, which is defined as the liquid volume pumped per gas volume. It is also desired to release a bubble volume that is a minimum necessary to lift liquid in the conduit while filling the conduit cross section. This maximizes the number of bubbles and thus the pump efficiency. Gas release into the conduit 40 is caused by pressure principally applied by the liquid body to the gas in the hood chamber 62. To initiate bubbling, the liquid level 64 in the chamber must be sufficiently below gas inlet level 66 to apply excess pressure to overcome surface tension at the inlet 48.

Once started, however, gas flow readily continues. This results in a post-bubble liquid level in the chamber that is generally above the gas inlet level 66. The bubble volume depends upon several factors, including the gassing rate at the electrodes and the size and shape of the several passages connecting the hood chamber and the conduit. In the described embodiment, openings 68 and 74 at right angles to channel 70 slow gas flow to avoid gushing and thereby help control bubble volume. However, it is apparent that other arrangements of connecting passages are suitable for conveying gas to the conduit.

The electrolyte circulation pump of this invention is particularly well-suited for incorporation into a lead-acid cell having an aqueous sulfuric acid electrolyte to reduce stratification. However, the pump is also suitable for circulating liquid electrolytes in other types of electrochemical cells. Although the preferred pump advantageously utilizes battery gas normally produced at the electrodes during recharging, the gas may be supplied by other means, for example, by electrodes immersed in the electrolyte body specifically to generate pumping gas. Although a one-way valve in the conduit is preferred for pumping stratified electrolytes, the valve would not be necessary for pumping electrolyte bodies having relatively uniform densities. Also, although the preferred electrolyte conduit extends up through a substantial portion of the electrolyte body, the conduit may suitably extend through only a portion of the body, particularly since a shorter conduit enhances pumping efficiency. The pump in the described embodiment was formed by boring passages in a polymer block. However, it is evident that pumps of this invention may be manufactured by other techniques.

Although this invention has been described in terms of one embodiment thereof, it is not intended to be limited to the above description, but rather only to the extent set forth in the claims that follow.

The embodiments of the invention in which an exclusive property or privilege is claimed are defined as follows:

1. An electrolyte circulation pump adapted for use in an electrochemical cell comprising a body of liquid electrolyte confined in a vented container and in which gas bubbles form in the electrolyte during cell operation, said pump comprising conduit means having an inlet and outlet for said electrolyte and adapted to be immersed in said electrolyte body with the inlet at a level below the outlet, said conduit further having a gas inlet below the level of said outlet such that gas bubbles introduced into the conduit through the gas inlet carry electrolyte from the electrolyte inlet to the electrolyte outlet, thereby inducing circulation of said electrolyte body, and means for collecting gas rising in said body and conducting it to said gas inlet to effectuate said circulation, said means comprising an upwardly convergent baffle member adapted to be immersed in said electrolyte body to intercept the bubbles and to collect the gas therefrom and a passage for gas to flow from said baffle to said conduit gas inlet.

2. An electrolyte circulation pump adapted for use in an electrochemical cell of the type where electrodes are immersed in a body of liquid electrolyte confined in a vented container and gas bubbles form at the electrodes during cell operation, said pump comprising conduit means having an inlet and outlet for said electrolyte and adapted to be immersed in said electrolyte body with the inlet at a level below the outlet, said conduit further having a gas inlet below the level of said outlet such that gas bubbles introduced into the electrolyte through the gas inlet rise and carry electrolyte to said outlet thereby inducing circulation of said electrolyte body, means for collecting gas from bubbles rising from the electrodes and comprising an open-bottom gas chamber and an upwardly convergent baffle member adapted to be immersed in said electrolyte body to intercept and divert the bubbles to said chamber, said chamber being adapted for collecting the gas from the bubbles at a pressure sufficient to cause gas to flow into the electrolyte at the conduit gas inlet, and a passage for gas to flow from said collecting chamber to said conduit gas inlet.

3. An electrolyte circulation pump adapted for use in an electrochemical cell of the type where electrodes are immersed in a stratified body of liquid electrolyte confined in a vented container and gas bubbles form at the electrodes during cell operation, said pump comprising a conduit adapted to be immersed in said electrolyte body and having an inlet for electrolyte adapted to be situated closely adjacent the bottom of the body in a region of relatively high electrolyte density, and an outlet adapted to be situated closely adjacent the surface of the body in a region of lower electrolyte density, a hood adapted to be immersed in the electrolyte body above the electrodes for collecting gas from bubbles rising therefrom, said hood comprising an open-bottom gas chamber adapted to hold gas exposed to the electrolyte at a level below the conduit outlet and at least one upwardly convergent baffle plate adapted to intercept and divert the bubbles to said chamber, and a gas passage connecting the hood chamber to the conduit at a level above said hood gas level for releasing collected gas into the conduit as bubbles, said passage comprising an inclined portion having a lower liquid drain for freeing the gas from any extrained liquid, whereby bubbles in the conduit rise, carrying electrolyte out the conduit outlet and causing electrolyte to be drawn in the conduit inlet, thereby inducing circulation of said electrolyte.

4. A self-stirring battery cell comprising, in combination, a body of liquid electrolyte in which gas bubbles are produced during cell operation, a hood immersed in said body and adapted to collect gas from bubbles rising in the electrolyte, at least a portion of the gas being collected at a predetermined level, conduit means immersed in said body and having an inlet and an outlet for said electrolyte such that the inlet is situated below the outlet and the outlet is at a level above said hood gas-collection level, and means for conveying collected gas from the hood to the conduit and for intermittently releasing the gas bubbles in the conduit at a level above the inlet and the hood gas-collection level and below the outlet, whereupon said bubbles rise in said conduit and carry electrolyte to the outlet, thereby stirring the electrolyte body.

5. An electrochemical cell construction having enhanced electrolyte stirring and comprising, in combination, a vented cell container, a body of liquid electrolyte in said container, electrodes immersed in said body and producing gas bubbles during cell operations, an electrolyte conduit extending from an inlet at a lower region of said body and an outlet at an upper region of said body, a hood immersed in said body and covering said electrodes, said hood comprising an open-bottom gas chamber for collecting gas therein at a level below said conduit outlet and at least a baffle member for diverting gas bubbles rising in said body above said electrodes to said chamber for collection, and a gas passage for conveying gas from said hood chamber to said conduit at a level below said conduit outlet and above said conduit inlet, and above said hood chamber gas collection level, and for intermittently releasing bubbles in said conduit which rise and carry electrolyte to said outlet, thereby stirring the electrolyte.

* * * * *

UNITED STATES PATENT AND TRADEMARK OFFICE
CERTIFICATE OF CORRECTION

PATENT NO. : 4,308,322
DATED : December 29, 1981
INVENTOR(S) : Richard H. Hammar It is certified that error appears in the above—identified patent and that said Letters Patent is hereby corrected as shown below:

Column 5, line 45, "extrained" should read -- entrained --.

Signed and Sealed this

Ninth Day of March 1982

[SEAL]

Attest:

GERALD J. MOSSINGHOFF

Attesting Officer     Commissioner of Patents and Trademarks